Feb. 19, 1957 G. S. EIGENBRODE 2,781,586
METHOD AND APPARATUS FOR SYNCHRONIZING THREADING ROLLS
Filed Jan. 25, 1955

INVENTOR
GLENN S. EIGENBRODE

BY *Strauch, Nolan & Diggins*

ATTORNEYS

United States Patent Office 2,781,586
Patented Feb. 19, 1957

2,781,586

METHOD AND APPARATUS FOR SYNCHRONIZING THREADING ROLLS

Glenn S. Eigenbrode, Waynesboro, Pa., assignor to Landis Machine Company, Waynesboro, Pa., a corporation of Pennsylvania Application January 25, 1955, Serial No. 484,036

6 Claims. (Cl. 33—181)

This invention relates to methods and apparatus for synchronizing threading rolls, particularly for timing a pair of threading rolls rotatably mounted in spaced relation in a holder and adapted to be moved laterally into contact with a work piece to roll a screw thread thereon.

For effective and accurate operation of a machine tool appliance of this general type, as for example that shown and described in the co-pending patent application of Harry L. Berkey and Frederic Nell, Serial No. 380,558, filed September 16, 1953, the thread profiles on the threading rolls must be accurately synchronized to enable the two profiles to "track," that is, to form a single, continuous, helical groove. In the past it has been customary to attempt this setting by sight and approximation only. Since such tools have usually been constructed to permit a small amount of axial movement of the rolls any slight inaccuracies in the approximate setting may be compensated for by relative axial movement of the rolls. However, the provision for axial movement of the rolls was made for other purposes in the operation of the device and very little is available to compensate for inaccuracies in the initial roll setting. Moreover, any relative axial movement of the rolls during threading induces unusual and unnecessary lateral strains on the thread ridges of the rolls, causing their early failure in use.

To avoid such excessive pressures, a second and closer setting was often made by experimentation if the approximate sight setting was not acceptably accurate. That is, a thread or partial thread was rolled on a work piece, which, upon inspection, indicated the direction and approximate degree of the further adjustment necessary. This process, besides involving the risk of damaging the rolls, consumed a large amount of time, with a consequent reduction in production figures.

Mechanical aids used for timing or synchronizing the rolls usually took the form of a plug gauge or work piece previously threaded by other means, which, when inserted between the rolls, permitted the rolls to be rotated until a mating condition was achieved. Since the rolls were axially movable, however, even a highly skilled operator could not obtain consistently accurate results with this method and a resetting was frequently required.

This invention obviates all of the above-described difficulties and disadvantages by providing rolls having index marks on their side faces, accurately located in the manufacture of the rolls, and method and apparatus for properly aligning these indices when the rolls are assembled in the carrier or holder. The requirement for skilled operators is completely eliminated and an accurate setting is obtained without time-wasting experimentation.

Accordingly, it is an object of this invention to provide improved methods and apparatus for synchronizing the helical contours of two laterally spaced threading rolls.

Another object is to provide such methods and apparatus which are simple, practical and accurate.

A further object is to provide improved methods and apparatus for effectively establishing the relative positions of the helical profiles of spaced threading rolls when the axial positions of said rolls are not fixed.

A still further object of the invention is to provide methods and apparatus as described above, the effectiveness of which is not dependent on operator skill.

Other objects and advantages will be apparent from a study of the following description of an embodiment of the invention and the accompanying drawings in which.

Figure 1:
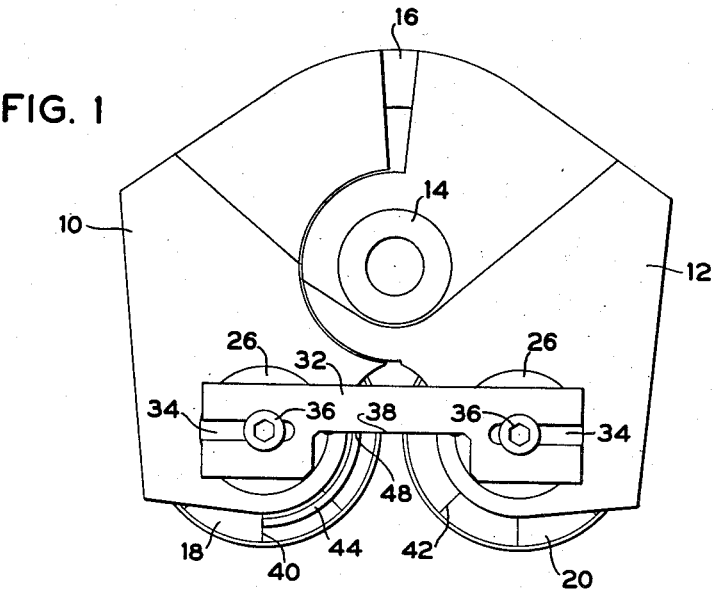
Figure 1 is a top plan view of a thread rolling tool showing the apparatus of the invention in operative position in accordance with the method of the invention.

The methods and apparatus of the invention will be disclosed in connection with a thread rolling attachment of the type disclosed in the above-identified application Serial No. 380,558. This attachment which will be described here only to the extent necessary to disclose a typical application of the invention, comprises two frame members 10 and 12 pivotally mounted on a bushing 14 which surrounds a pin (not shown) by means of which the entire tool is supported in an automatic screw machine or the like. A strap member 16 connects the frame members at the rear thereof to effectively prevent relative rotation of the frame members about bushing 14 while the device is in operation.

Thread forming rolls 18, 20 are received in a slot 22 passing through both frame members 10 and 12 and are journalled for rotation on shafts 24 (one shown). Mounting means for the shafts 24 include the flanged bushings 26 mounted in the side of frame members 10 and 12, pins 28 for preventing rotation of the bushings 26 and wear plates 30 partially embedded in the side wall of slot 22 to prevent the threading roll from coming into contact with said wall, all as disclosed in the above-mentioned patent application.

As is well known, in order to produce an accurate thread on the work piece and to reduce the stresses on the rolls, the proper relationship of the thread profile of one roll 18 to the thread profile of the other roll 20 must be established and maintained. Once this relationship is established, tools of this kind provide various means for maintaining it. In the attachment shown, the timing is maintained by a gearing connection (not shown) between the shafts 24, so that rotation of one shaft produces identical rotation of the other. Since, for the purpose of initially setting the timing relationship, one roll must be rotated relative to the other, the function of maintaining the timing must be temporarily suspended, in this case by removing one of the gears.

One component of the timing device proper, herein termed a timing gauge, comprises a flat strip 32 of rigid material, having a slot 34 at each end thereof to permit the passage therethrough of screws 36 by means of which the strip 32 is secured to both of the flanged bushings 26. In this particular thread rolling appliance, provision is made for altering the distance between the axes of the rolls 18 and 20 by the use of strap members 16 of various lengths. Accordingly, the slots 34 permit the application of the strip 32 in the same manner for any axial separation of the rolls. The strip 32 is indented on the forward side to form a reference edge 38 which is preferably so located with respect to the slots 34 as to lie accurately on the line joining the centers of the two rolls, this being the point at which, in the relative lateral travel between tool and work, the thread rolling operation is completed. Hence it is on this line that timing of the rolls is most easily accomplished. It will be understood that the edge 38 need not be continuous, the only requirement being that it have straight edge portions opposite the side surfaces of the rolls.

The rolls 18 and 20 are usually made much larger than the work piece and approximately in multiples of the pitch diameter of the work piece so that the rolls will have a number of thread starts which is an integer multiple of the number of thread starts on the work. In the manufacture of the rolls a plurality of index marks 40 are inscribed on the side of roll 18 to mark accurately the angular location of each thread start while similar index marks 42 are inscribed on the side of roll 20 to mark precisely corresponding angular positions of the profile of that roll. Preferably these marks are in the form of radial lines, as shown.

Figure 2:
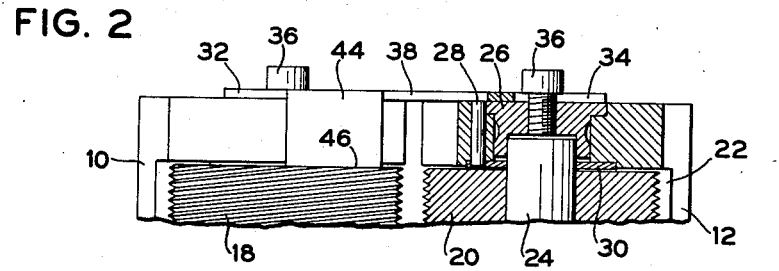
Figure 2 is a partial front elevation of the parts shown in Figure 1, partially in section.
Figure 3:
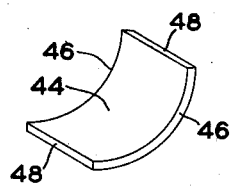
Figure 3 is an isometric view of one member of the timing device.

Thus, to correlate properly the profiles of the two rolls it is merely necessary to align any one of the index marks 40 and any one of the index marks 42 with the reference edge 38. Since, as shown in Figure 2, reference edge 38 is disposed a substantial distance above the sides of rolls 18 and 20, the alignment is accomplished by the provision and use of an arcuate timing segment 44 (Figure 3) having top and bottom edges 46 one of which rests on the side surface of one of the rolls and two end edges 48, both accurately perpendicular to the plane of edges 46. The central portion of the edges 46 and 48 may be cut away, if desired although they are preferably straight from end to end as shown. The edge 48 therefore projects the location of the reference edge 38 into contact with the side surface of the roll, eliminating any possible error due to sighting along edge 38 at an incorrect angle. Accordingly, with the timing gauge in the position shown, and with the side surfaces of the rolls containing the index marks 42 disposed in a horizontal plane, the alignment may be effected by positioning the segment 44 with the edge 46 on the surface of the roll and the adjacent end of edge 48 on one of the marks 40 or 42. The roll is then rotated if necessary to bring the other end of edge 48 against reference edge 38. The procedure is then repeated with the other roll. After alignment of the rolls, the gear previously removed is restored to its proper position. If the spacing of the teeth on this gear causes the alignment to be disturbed, the gear should be again removed and two other index marks on the roll sides should be aligned and the process repeated.

From the foregoing it will be apparent that the above-stated objects of the invention have been achieved and that simple inexpensive apparatus and an easily performed method have been provided for synchronizing thread rolls which insures accuracy of the set up while decreasing set up time and eliminating the need for skilled operators.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for synchronizing threading rolls rotatably mounted in a support comprising means defining radially extending reference lines on said rolls in predetermined relation with the thread starts on the rolls, a timing gauge adapted to be secured to said support, said gauge having a reference edge disposed on a line joining the centers of said rolls when said gauge is secured to said support, and a timing gauge segment having an edge adapted to extend from one of said reference lines to said reference edge in a direction parallel to the axis of the rolls whereby said rolls may be synchronized by positioning them with one end of the edge of said timing segment on said reference line and another portion of the segment edge against said reference edge.

2. Apparatus for synchronizing threading rolls rotatably mounted in bushings rigid with a support, comprising a timing gauge having a reference edge and openings adjacent its opposite ends, headed screws mounted on said bushings coaxially thereof and adapted to extend through said openings in said gauge to thereby secure said gauge to said support, said openings and said reference edge being so related that when said gauge is secured to said support said reference edge extends on a line joining the roll centers, means defining radially extending reference lines on said rolls in predetermined relation with the thread starts on said rolls, and a timing gauge segment having an edge adapted to extend from one of said reference lines to said reference edge whereby said rolls may be synchronized by positioning them with one end of the edge of said timing gauge segment on said reference line and another portion of the segment edge disposed against said reference edge.

3. The apparatus according to claim 2 wherein said support is constructed and arranged to permit relative movement of said rolls toward and away from each other and said openings in said timing gauge are elongated in a direction parallel to said reference edge whereby said gauge may be secured to said support by said screws in any position of said rolls.

4. Apparatus for synchronizing threading rolls mounted for rotation about predetermined axes in a support comprising means defining index marks on said rolls which, when aligned, indicate the desired synchronization, a timing gauge adapted to be secured to said support, said gauge having reference edge portions disposed on a line joining said axes when said gauge is secured to said support, and a timing gauge segment having right angularly related edges whereby said rolls may be synchronized by positioning them with one related edge of said segment on the surface of said rolls and the other related edge in alignment with one of said index marks and with said reference edge.

5. A method of synchronizing a pair of normally gear-connected threading rolls in a support, said rolls having visible index marks which, when aligned, indicate the desired synchronization, comprising the steps of assembling said rolls in said support with said gear connection disengaged to permit free relative rotary movement of said rolls about predetermined axes, positioning a timing gauge having a reference edge so as to dispose said edge on a line joining said axes, positioning one of the rolls and a timing segment having right angularly related edge portions to dispose one edge on the surface of said roll and the other edge in alignment with one of said index marks and with said reference edge, similarly positioning a timing segment and the other roll and engaging said gear connection to maintain the synchronization.

6. A method of synchronizing gear connected threading rolls in a support, said rolls having visible index marks which, when aligned, indicate the desired synchronization, comprising the steps of disengaging said gear connection to permit free relative rotary movement of said rolls about predetermined axes, positioning a timing gauge having a reference edge so as to dispose said edge on a line joining said axes, positioning a timing segment having a pair of right angularly related edge portions with one edge on the surface of said rolls and the other edge extending away from said surface toward said reference edge from one of said index marks, rotating said roll to dispose another portion of said other edge against said reference edge, and reengaging said gear connection to maintain the synchronization.

References Cited in the file of this patent
UNITED STATES PATENTS

| | | |
|---|---|---|
| 737,560 | Nunnally | Aug. 25, 1903 |
| 1,439,321 | Page | Dec. 19, 1922 |
| 1,981,751 | Passler | Nov. 20, 1934 |
| 2,511,496 | Darwin | June 13, 1950 |
| 2,556,760 | John | June 12, 1951 |